No. 891,189. PATENTED JUNE 16, 1908.
C. G. A. SCHMIDT, Jr.
DRIVE CHAIN.
APPLICATION FILED FEB. 5, 1907.

Witnesses:
H. A. Hall
E. Batchelder

Inventor:
Carl G. A. Schmidt Jr.
by Wright Brown Quimby May
Attys.

UNITED STATES PATENT OFFICE.

CARL G. A. SCHMIDT, JR., OF NEW YORK, N. Y.

DRIVE-CHAIN.

No. 891,189.  Specification of Letters Patent.  Patented June 16, 1908.

Application filed February 5, 1907. Serial No. 355,891.

*To all whom it may concern:*

Be it known that I, CARL G. A. SCHMIDT, Jr., of New York city, in the county of New York and State of New York, have invented certain new and useful Improvements in Drive - Chains, of which the following is a specification.

This invention relates to sprocket chains composed of jointed links which are formed to engage teeth of sprocket wheels, and impart motion from a driving wheel to a driven wheel, the links being provided at their inner edges with projections adapted to act as gear teeth in conjunction with gear teeth of the sprocket wheels on which the chain runs, substantially as shown in Letters Patent No. 755,707, granted to me March 29, 1904.

The present invention has for its object to provide an improved construction whereby the pins which articulately connect the links may be readily removed at any part of the chain to permit the continuity of the chain to be interrupted at any desired point.

The invention consists in the improvements which I will now proceed to describe and claim.

Figure 1:
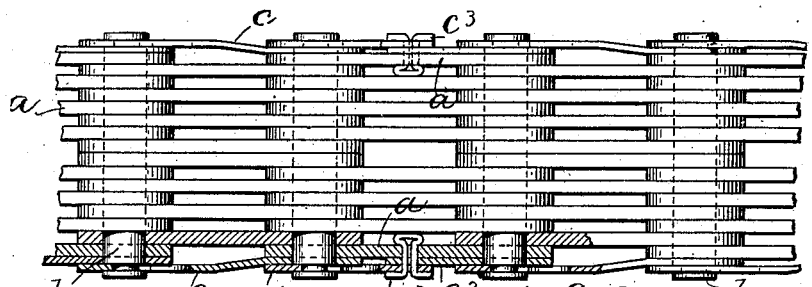
Figure 2:
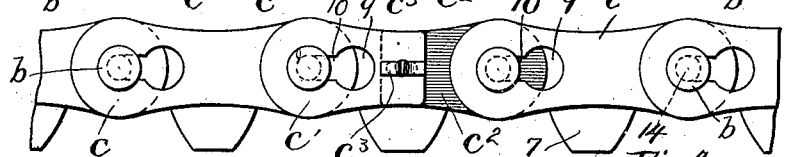
Figure 3:
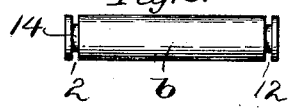
Figure 4:
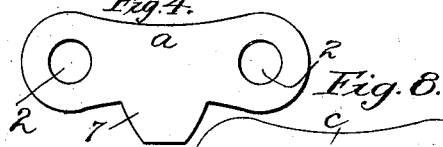
Figure 5:
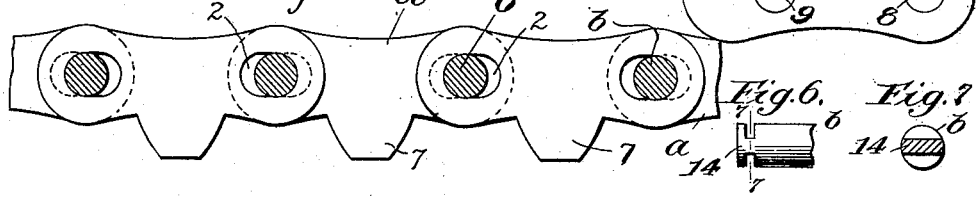

Of the accompanying drawings, forming a part of this specification,—Figure 1 represents a plan view of a portion of a chain embodying my invention, looking toward the back of the chain. Fig. 2 represents an edge view of the portion represented in Fig. 1. Fig. 3 represents a side view of one of the link-connecting pins. Fig. 4 represents a side view of one of the toothed links. Fig. 5 represents a side view of a series of links of somewhat different construction from that shown in Fig. 4, the links being connected by pins, which are shown in section. Figs. 6, 7 and 8 represent fragmentary views of modified forms of the pin and retaining link hereinafter referred to, Fig. 7 being a section on line 7—7 of Fig. 6.

The same letters of reference indicate the same parts in all the figures.

In the drawings, $a$ $a$ represent toothed links of my improved chain, said links being preferably flat blanks of steel having orifices 2 2 in their end portions, each link having at one edge a projection 7 constituting a gear tooth, substantially as shown in the above-mentioned Letters Patent. The links are articulately connected by transverse pins $b$ adapted to be removably inserted in the orifices 2, each pin having a free sliding fit so that it can be readily inserted in and removed from the orifices 2, to enable the continuity of the chain to be interrupted at any point by removing a pin at that point, and separating the links connected thereby. The chain is provided with means for detachably holding the pins in engagement with the links, and preventing their accidental displacement, the preferred means being keepers suitably connected with the chain so as to move therewith, and adapted to be moved into and out of engagement with the end portions of the pins. In the preferred embodiment of my invention shown in Figs. 1, 2, 3, 4, and 5, the said keepers are in the form of overlapping retaining links $c$, the end portions of which are offset, as shown in Fig. 1, each link being preferably of the same length as each of the toothed links $a$. One end portion of each retaining link is provided with an orifice 8 adapted to receive one of the pins $b$, the opposite end portion of the same retaining link being provided with an orifice 9 adapted to receive the adjacent pin $b$, the said orifice 9 being provided with a reduced extension 10 which is narrower than the diameter of the orifice 9, the two forming, in this embodiment of my invention, a keyhole shaped slot. Each pin $b$ is grooved at its end portions, as shown at 12 12, Fig. 3, the grooving of the pins forming reduced necks adjacent to the outer ends of the pins, the said outer ends constituting heads. The reduced necks formed by the grooves are adapted to enter the reduced portions 10 of the key-hole shaped orifices in the retaining links, and thus prevent endwise movement of the pin, the pin and corresponding retaining links being interlocked or coupled together, so that no endwise displacement of the pin is possible. The distance between the orifices 8 and 9 of the retaining link is less than the distance between two adjacent pins in the chain.

Each retaining link is applied by passing the orifice 9 over the end of the corresponding pin, and then moving the retaining link endwise until the reduced extension 10 engages the neck of the pin, the orifice 8 of the retaining link at the same time being brought into coincidence with the adjacent pin $b$ so that it may be slipped over the end of the latter. It will be seen, therefore, that provision is made for locking and unlocking the pins, the pins when locked being securely held in position and when unlocked being free to be pushed out from the holes in the links. To release any pin, the retaining links holding it may be disengaged by first springing the end containing the orifice 8 off from the pin that engages it, and then moving the retaining link endwise until the orifice 9 is in position to slip off from the other pin. The above-described mode of operation is employed when the orifices 2 of the toothed links have a close fit on the pins, as in chains for machinery drives, the advantages being the elimination of riveting of pins with consequent reduction in cost of manufacturing, a uniform and symmetrical appearance, and ease of assembling the parts of the chain at any locality.

In the embodiment of the invention shown in Figs. 1, 2, 3, and 4, two of the retaining links at opposite edges of the chain are preferably made in sections, which are detachable independently of each other. These sections are shown at the central portions of Figs. 1 and 2, one of the sections being designated $c'$ and the other $c^2$. One of the sections has the keyhole-shaped orifice 9 10, while the other has the circular orifice 8. The meeting ends of the sections overlap, and are provided with coinciding orifices adapted to receive a split pin $c^3$, which may pass through an orifice in the adjacent toothed link $a$, the ends of its arms or divisions being turned outwardly and clenched upon the outer surface of the section $c'$. When the pin $c^3$ is removed, the section $c'$ may be detached without interfering with the section $c^2$. It will be seen that by removing the two sections $c'$, one at one edge of the chain and one at the other, the pin engaged with these sections is released, and may be forced out from the chain. If it is desired to remove a pin $c$ at a distance from the links composed of the sections $c'$ and $c^2$, the intervening pins and links are consecutively detached until the desired pin is reached.

In automobile chains or those of similar nature, to enable the continuity of the chain to be interrupted at any desired point without disturbing or displacing the parts of the chain elsewhere, the said orifices 2 may be elongated, as shown in Fig. 5, sufficiently to permit two adjacent pins to be moved toward each other, thus shortening or longitudinally compressing the chain. The elongation of the orifices 2 is such that either pin may be moved toward the companion pin to the extent required to disengage its grooved portion from the reduced portion 10 of the orifice containing it, the pin being thus moved into the enlarged portion 9 so that it is free to be pushed out endwise, no outward springing of the ends of the retaining links containing the orifices 8 being required. The grooved portions of the pins and the extensions 10 of the pin-receiving orifices constitute complemental coupling members whereby the pins and retaining links may be engaged with and disengaged from each other.

Figures 6, 7, 8:
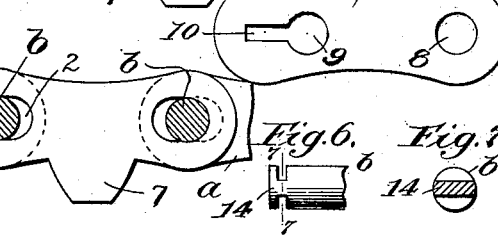

The grooves forming the necks 14 may be formed, as shown in Figs. 6 and 7, to give the said necks a rectangular or irregular cross section, the orifice extension 10 being correspondingly formed, as shown in Fig. 8, thus causing the pins to turn with the retaining links.

It will be seen that the heads forming the outer portions of the coupling members of the pins $b$, bear on the outer sides of the retaining links when the pins and links are operatively engaged, so that the retaining links cannot be sprung outwardly or laterally from the edges of the chain. Provision is thus made against accidental displacement of any retaining link by an external object with which it may come in contact when the chain is moving.

I claim:

1. A drive chain comprising toothed overlapping links having orifices in their end portions, pins removably inserted in said orifices, and each having coupling members at its opposite end portions, and pin keepers composed of retaining links located at the edges of the chain, and each having offset end portions provided with pin-receiving orifices, one of which is extended to form a coupling member, which is integral with the link, and is adapted to engage a coupling member on a pin.

2. A drive chain comprising toothed overlapping links having orifices in their end portions, pins removably inserted in said orifices, and having coupling members at their ends, and pin keepers composed of retaining links, located at the edges of the chain, and each having offset end portions provided with pin-receiving orifices, one of which is extended to form a coupling member adapted to engage a coupling member on a pin, the pin-receiving orifices in the toothed links being elongated to permit longitudinal contraction of any part of the chain, and the disengagement of either of the pins from the corresponding retaining link.

3. A drive chain comprising toothed overlapping links having orifices in their end portions, pins removably inserted in the orifices, and being grooved at their end portions, and retaining links having orifices adapted to coincide with the orifices in the toothed links, one orifice in each link having a reduced extension adapted to engage the grooved portion of a pin, the orifices in the toothed links being elongated to permit sidewise movement of any pin toward an adjacent pin to disengage its grooved portions from the slot extensions of the corresponding retaining links.

4. A drive chain comprising toothed links, pivot pins engaging the links, each pin having a neck and a head at each end portion, and retaining links each adapted to engage the neck of one pin to detachably lock the latter, and at the same time to engage the body of an adjacent pin at a point inside the neck, the retaining links overlapping each other so that the neck-engaging end of each retaining link locks the body-engaging end of another retaining link, the heads of the pins locking the retaining links against outward movement from the edges of the chain.

5. A drive chain comprising toothed links, pivot pins engaging the links, each pin having a neck and a head at each end portion, and retaining links, each adapted to engage two adjacent pins, said links having their end portions offset from each other to permit the meeting ends of the links to overlap, and engage the same pin, each link having means for detachably engaging the neck and head of one of the pins with which it is engaged.

6. A drive chain comprising toothed links, pivot pins engaging the links, each pin having a neck and a head at each end portion, and retaining links having offset end portions, each link having at one end portion an orifice receiving one of the pins, and confining the latter against sidewise, but not against endwise, movement, and at its opposite end portion a keyhole-shaped orifice adapted to engage the neck and head of the adjacent pin, and confine the latter against endwise, but not against sidewise movement.

In testimony whereof I have affixed my signature, in presence of two witnesses.

CARL G. A. SCHMIDT, JR.

Witnesses:
   CORA ELIZABETH SCHMIDT,
   DAVID MOFFAT MYERS.